us009422959B2

(12) United States Patent
Clark

(10) Patent No.: US 9,422,959 B2
(45) Date of Patent: Aug. 23, 2016

(54) METHOD FOR INTERCONNECTION OF STRUCTURAL COMPONENTS

(71) Applicant: Oldcastle BuildingEnvelope, Inc., Dallas, TX (US)

(72) Inventor: Phil Clark, Terrell, TX (US)

(73) Assignee: Oldcastle BuildingEnvelope, Inc., Plano, TX (US)

( * ) Notice: Subject to any disclaimer, the term of this patent is extended or adjusted under 35 U.S.C. 154(b) by 0 days.

(21) Appl. No.: 14/635,687

(22) Filed: Mar. 2, 2015

(65) Prior Publication Data

US 2015/0167712 A1   Jun. 18, 2015

Related U.S. Application Data

(63) Continuation of application No. 13/434,433, filed on Mar. 29, 2012, now Pat. No. 8,998,527.

(60) Provisional application No. 61/469,504, filed on Mar. 30, 2011.

(51) Int. Cl.
| | |
|---|---|
| *F16B 2/20* | (2006.01) |
| *F16B 7/04* | (2006.01) |
| *E06B 3/964* | (2006.01) |
| *E06B 1/52* | (2006.01) |

(52) U.S. Cl.
CPC ............ *F16B 7/0473* (2013.01); *E06B 3/9642* (2013.01); *E06B 3/9643* (2013.01); *E06B 1/524* (2013.01); *Y10T 29/49616* (2015.01); *Y10T 403/4602* (2015.01); *Y10T 403/4628* (2015.01); *Y10T 403/64* (2015.01)

(58) Field of Classification Search
CPC .... E06B 3/6942; E06B 3/964; E06B 3/9681; E06B 1/524; F16B 7/0473

USPC ............... 403/231, 240, 243, 248–251, 403; 256/65.02; 52/656.9

See application file for complete search history.

(56) References Cited

U.S. PATENT DOCUMENTS

| | | | |
|---|---|---|---|
| 925,677 A | 6/1909 | Belcher | |
| 1,799,160 A | 4/1931 | Franks | |
| 2,853,750 A | 9/1958 | Davies et al. | |
| 2,941,855 A | 6/1960 | Weill | |
| 2,963,126 A | 12/1960 | Cudini | |
| 2,989,141 A | 6/1961 | Howard | |
| 3,057,444 A | 10/1962 | Walberg | |
| 3,276,802 A * | 10/1966 | O'Brien | ........................ 52/690 |

(Continued)

FOREIGN PATENT DOCUMENTS

GB   2234992 A   2/1991

*Primary Examiner* — Joshua Kennedy
(74) *Attorney, Agent, or Firm* — Winstead PC

(57) ABSTRACT

A structural component interconnect assembly includes a first component adapted for interconnection with a second component. A connection component is adapted for securing the first component and the second component together in a secured interconnection. The connection component includes at least two flanges spaced from each other by a first distance. The first component includes a mating surface having at least two slots formed therein and spaced one from another by the first distance. The second component includes a first surface and a second surface spaced one from the other by a distance on the order of the first distance. Engagement of the at least two flanges, via the at least two slots, with the first surface and the second surface secures the first component to the second component.

5 Claims, 6 Drawing Sheets

(56) References Cited

U.S. PATENT DOCUMENTS

| | | | |
|---|---|---|---|
| 3,293,813 A | 12/1966 | Emmons et al. | |
| 3,353,301 A | 11/1967 | Heilweil et al. | |
| 3,375,030 A * | 3/1968 | Thompson | 403/231 |
| 3,417,537 A | 12/1968 | Wilson | |
| 3,466,826 A | 9/1969 | Gallagher et al. | |
| 3,526,071 A | 9/1970 | Wantanabe | |
| 3,592,493 A | 7/1971 | Goose | |
| 3,601,946 A | 8/1971 | Rothemund | |
| 3,642,310 A | 2/1972 | Hudson | |
| 3,734,550 A | 5/1973 | Vance | |
| 3,842,554 A | 10/1974 | Swick | |
| 3,920,345 A * | 11/1975 | Stoltz | 403/173 |
| 3,932,974 A | 1/1976 | Wright | |
| 3,940,897 A | 3/1976 | Stoakes | |
| 3,940,900 A * | 3/1976 | Russo | 52/656.1 |
| 3,949,836 A | 4/1976 | Russo | |
| 4,008,552 A | 2/1977 | Biebuyck | |
| 4,036,371 A * | 7/1977 | Michel | 211/182 |
| 4,141,188 A | 2/1979 | Sukolics | |
| 4,240,764 A | 12/1980 | Wegner | |
| 4,275,533 A | 6/1981 | Wright | |
| 4,285,610 A * | 8/1981 | Rusch | 403/189 |
| 4,292,771 A | 10/1981 | Ellis | |
| 4,386,486 A | 6/1983 | Holt et al. | |
| 4,453,355 A | 6/1984 | Stoakes | |
| 4,584,804 A | 4/1986 | Tajima | |
| 4,619,092 A | 10/1986 | Kaminaga | |
| 4,621,478 A | 11/1986 | Phillips et al. | |
| 4,724,637 A | 2/1988 | Evans | |
| 4,738,065 A | 4/1988 | Crandell | |
| 4,799,344 A | 1/1989 | Francis | |
| 4,803,820 A | 2/1989 | Metrick | |
| 4,809,955 A | 3/1989 | Veilleux | |
| 4,817,351 A | 4/1989 | Michlovic | |
| 4,873,806 A | 10/1989 | Jeschke | |
| 4,899,508 A | 2/1990 | Biebuyck | |
| 4,981,276 A | 1/1991 | Agor et al. | |
| 4,984,400 A | 1/1991 | Bockmiller | |
| 4,989,384 A | 2/1991 | Kinghorn et al. | |
| 4,996,809 A | 3/1991 | Beard | |
| 4,999,961 A | 3/1991 | McNary | |
| 5,065,557 A | 11/1991 | Laplante et al. | |
| 5,077,947 A | 1/1992 | Takeda | |
| 5,095,672 A | 3/1992 | Tanikawa | |
| 5,105,593 A | 4/1992 | Kaminaga et al. | |
| 5,185,979 A | 2/1993 | Azzimonti | |
| 5,252,154 A | 10/1993 | Hoffman | |
| 5,253,459 A | 10/1993 | Parinas et al. | |
| 5,323,577 A | 6/1994 | Whitmyer | |
| 5,333,428 A | 8/1994 | Taylor et al. | |
| 5,354,410 A | 10/1994 | Cohen et al. | |
| 5,363,625 A | 11/1994 | Philippi | |
| 5,381,637 A | 1/1995 | Farag | |
| 5,467,566 A | 11/1995 | Swartz et al. | |
| 5,546,713 A | 8/1996 | Voegele, Jr. et al. | |
| 5,560,149 A | 10/1996 | Lafevre | |
| 5,592,795 A | 1/1997 | Rinehart et al. | |
| 5,598,672 A | 2/1997 | Nawa | |
| 5,746,032 A | 5/1998 | Koike et al. | |
| 5,839,236 A | 11/1998 | Frey | |
| 5,934,038 A | 8/1999 | Clausen | |
| 5,937,597 A | 8/1999 | Sono et al. | |
| 6,006,489 A | 12/1999 | Zadok | |
| 6,158,182 A | 12/2000 | Biebuyck | |
| 6,226,940 B1 | 5/2001 | Biebuyck et al. | |
| 6,517,276 B2 | 2/2003 | Chen | |
| 6,993,873 B2 | 2/2006 | Biebuyck et al. | |
| 8,082,695 B2 | 12/2011 | Lin | |

* cited by examiner

METHOD FOR INTERCONNECTION OF STRUCTURAL COMPONENTS

CROSS-REFERENCE TO RELATED APPLICATIONS

This application is a continuation of U.S. patent application Ser. No. 13/434,433, filed Mar. 29, 2012 (now U.S. Pat. No. 8,998,527) U.S. patent application Ser. No. 13/434,433 claims priority from U.S. Provisional Patent Application No. 61/469,504, filed Mar. 30, 2011. U.S. patent application Ser. No. 13/434,433 and U.S. Provisional Patent Application No. 61/469,504 are incorporated herein by reference.

BACKGROUND

1. Field of the Invention

The present invention relates to structural interconnections and more particularly, but not by way of limitation, to methods and systems for securing structural components such as, for example, doors and door frames.

2. History of the Related Art

When joining two or more structural members such as, for example, doors and door frames through processes such as, for example, welding, gluing, brazing, soldering, chemical bonding, and the like, it is common to secure the two or more structural members in a desired configuration so as to prevent incidental movement. Securing the two or more structural members often includes utilizing a specialized tool commonly known as a "jig" or a "fixture." The jig, for example, holds the two or more structural members in the desired configuration and prevents undesired incidental movement. In most cases, the jig is removed immediately after use and provides no added structural support. By way of example, in the case of doors and door frames, the jig often utilizes at least one screw that is placed through a horizontal member and into at least one vertical member thereby securing the horizontal member and the at least one vertical member.

The use of screws when securing components to be welded is not without problems. First, screws often require threaded holes to be formed in each component through which the screws pass. Often times, this is a two-step process of drilling a hole and, subsequently, tapping the drilled hole. The process of forming threaded holes adds costs to a structural assembly in the form of increased labor and material expense. Second, screws do not entirely eliminate movement between the horizontal member and the at least one vertical member. Furthermore, in many cases, the jig is often removed after securement and adds no additional support to the structural assembly.

SUMMARY

The present invention relates to structural interconnections and more particularly, but not by way of limitation, to methods and systems for securing structural components during assembly. One aspect of the present invention relates to a structural component interconnect assembly. The structural component interconnect assembly includes a first component adapted for interconnection with a second component. A connection component is adapted for securing the first component and the second component together in a secured interconnection. The connection component includes at least two flanges spaced from each other by a first distance. The first component includes a mating surface having at least two slots formed therein and spaced one from another by the first distance. The second component includes a first surface and a second surface spaced one from the other by a distance on the order of the first distance. Engagement of the at least two flanges, via the at least two slots, with the first surface and the second surface secures the first component to the second component.

Another aspect of the present invention relates to a method for assembling structural components. The method includes providing a first component having a first surface and a second surface and providing a connection component having at least two flanges. The method further includes coupling the connection component with a second component such that the at least two flanges protrude from the second component, inserting the at least two flanges between the first surface and the second surface, and securing the first component to the second component via friction between the first component and the connection component.

Another aspect of the present invention relates to a structural component interconnect assembly. The structural component interconnect assembly includes a first component having a first surface and a second surface. The first surface and the second surface together define an interior gap. The structural component interconnect assembly further includes a connection component having at least two flanges. An exterior face of the at least two flanges is spaced from each other by a distance approximately equal to a distance between the first surface and the second surface. A second component is operable to receive the connection component such that the at least two flanges protrude outwardly from the second member. Upon insertion into the interior gap, the at least two flanges engage the first surface and the second surface thereby securing the first component to the second component.

BRIEF DESCRIPTION OF THE DRAWINGS

A more complete understanding of the method and system of the present invention may be obtained by reference to the following Detailed Description when taken in conjunction with the accompanying drawings wherein.

DETAILED DESCRIPTION

Various embodiments of the present invention will now be described more fully with reference to the accompanying drawings. The invention may, however, be embodied in many different forms and should not be construed as limited to the embodiments set forth herein.

As used herein, the term "interference fit" refers to joining two mating parts via friction. The two mating parts being held together via friction is greatly increased by compression of one part against the other. A magnitude of friction resulting from the compression depends upon tensile and compressive strengths of materials from which two mating parts are constructed. Common examples of an interference fit include, for example, fitting of shafts into bearings, assembly of various pipe fittings, and the like. An interference fit may be created via, for example, force or thermal expansion.

An interference fit created by force (also commonly known as a "press fit" or a "friction fit") is achieved via tools that are operable to press the two mating parts together with large amounts of force. The tools may range in size and complexity from large hydraulic presses, capable of delivering several tons of force, to small hand-operated mechanical presses.

An interference fit created by thermal expansion relies on the principle that most materials expand when heated and contract when cooled. Enveloping parts such as, for example, a bearing, are heated, assembled into position while hot, and then allowed to cool and contract back to normal size. When creating an interference fit via, for example, thermal expansion, care must be taken not to alter mechanical properties of the two mating parts. For example, hardness of metallic components is particularly susceptible to change due to repeated heating and cooling.

Figure 1:
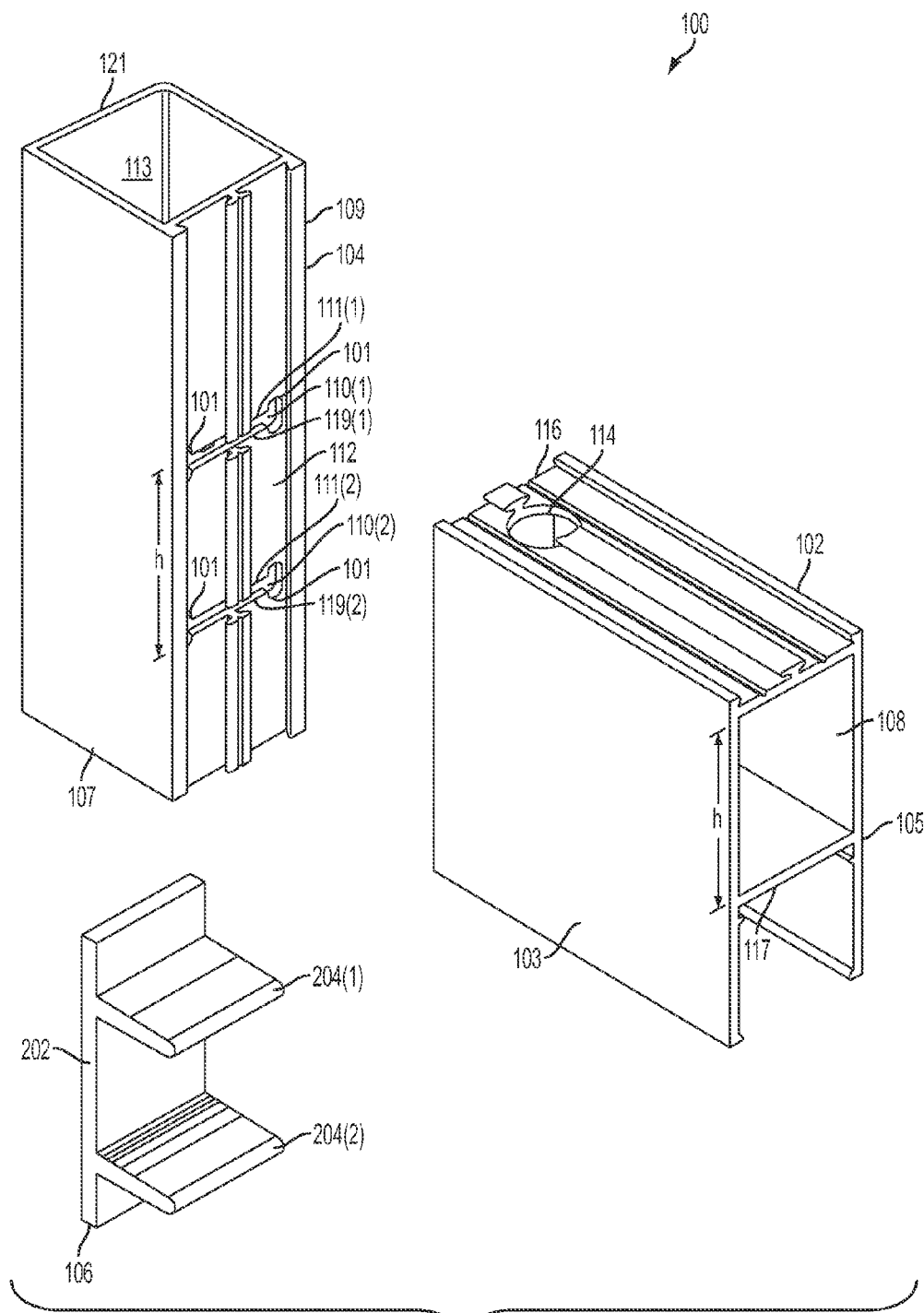
FIG. 1 is an exploded perspective view of a structural assembly according to an exemplary embodiment.

FIG. 1 is an exploded assembly view of a structural assembly according to an exemplary embodiment. An assembly 100 includes a first component 102, a second component 104, and a connection component 106. The first component 102 includes a left side 103 and a right side 105 connected by a first surface 116 and a second surface 117. The first surface 116 and the second surface 117 define an interior gap 108 having a height (h). An access port 114 is formed in the first surface 116 of the first component 102 and a second access port 115 (shown in FIG. 5) is formed in the second surface 117.

The second component 104 includes a left side 107, a right side 109, a rear face 121, and an interior face 112. The left side 107, the right side 109, the rear face 121, and the interior face 112 define an interior region 113 within the second component 104. A first slot 110(1) and a second slot 110(2) formed on an interior face 112. The first slot 110(1) includes an upper edge 111(1) and a lower edge 119(1). The second slot 110(2) includes an upper edge 111(2) and a lower edge 119(2). The upper edge 111(1) of the first slot 110(1) and the lower edge 119(2) of the second slot are separated from each other by a distance generally equal to the height (h) of the interior gap 108. In other embodiments, components utilizing principles of the invention may include a single slot of a height generally equal to the height (h) of the interior gap. The first slot 110(1) and the second slot 110(2) include generally-vertical end regions 101. The generally-vertical end regions 101 ensure that the first slot 110(1) and the second slot 110(2) have may accommodate a rectangular shaped member therethrough.

The connection component 106 includes a base 202, a first flange 204(1), and a second flange 204(2). In a typical embodiment, the first component 102 and the second component 104 are constructed from a material that is light weight and sturdy such as, for example, extruded aluminum, plastic, or other appropriate material. The connection component 106 is constructed from, for example, aluminum or plastic; however, any material appropriate for such purpose may be used. In a typical embodiment, the connection component 106 is constructed from the same material as the first component 102 and the second component 104 to avoid differing coefficients of thermal expansion. Intense heating common during welding often creates a high temperature differential that induces different rates of thermal expansion in different materials. Damage to the structural assembly 100 could result if the connection component 106 is constructed from a different material than the first component 102 or the second component 104.

Figure 2:
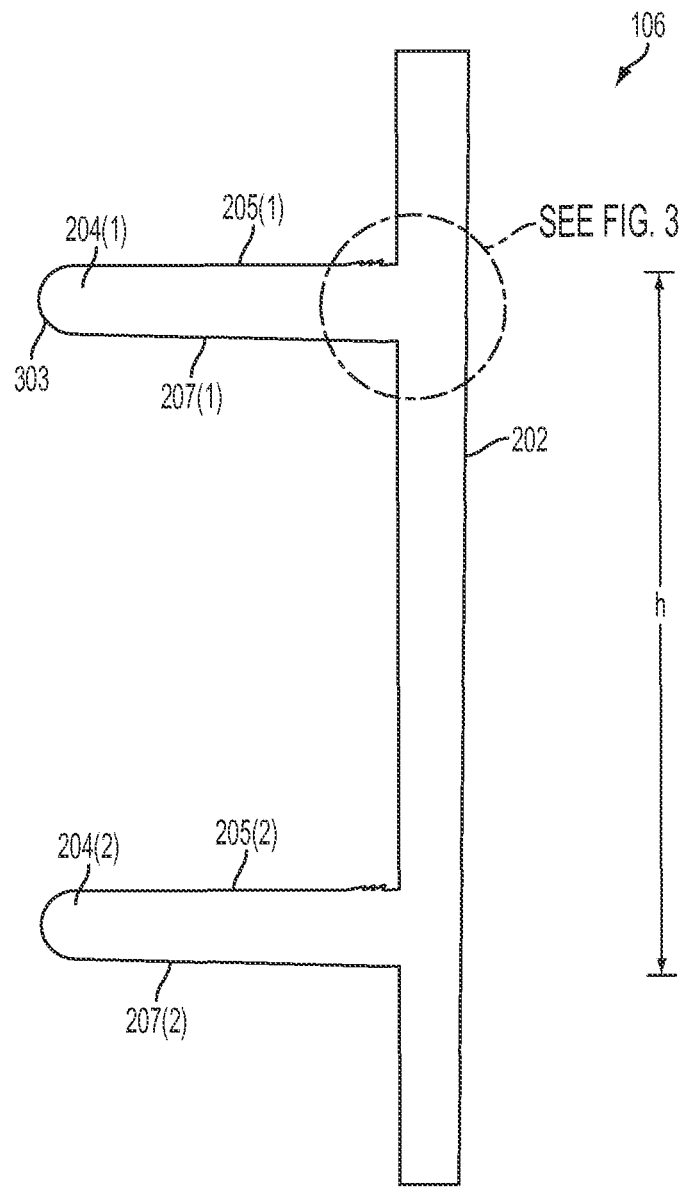
FIG. 2 is a side view of a connection component according to an exemplary embodiment.

FIG. 2 is a side view of a connection component according to an exemplary embodiment. The connection component 106 includes a base 202, a first flange 204(1), and a second flange 204(2). The embodiment shown in FIG. 2 illustrates the first flange and the second flange 204(1) and 204(2); however, in various alternative embodiments, any number of flanges could be utilized. The first flange 204(1) and the second flange 204(2) extend generally orthogonally from the base 202; however, in various alternative embodiments, flanges utilizing principles of the invention may be oriented at any angle relative to each other or the base 202. In a typical embodiment, the first flange 204(1) and the second flange 204(2) extend from the same side of the base 202; however, in alternative embodiments, flanges utilizing principals of the invention may be present on both sides of the base 202. The first flange 204(1) includes a top surface 205(1) and a bottom surface 207(1). The second flange 204(2) includes a top surface 205(2) and a bottom surface 207(2). The top surface 205(1) of the first flange 204(1) and the bottom surface 207(2) of the second flange 204(2) are separated from each other by a distance generally equal to the height (h) of the interior gap 108 (illustrated in FIG. 1).

Figure 3:
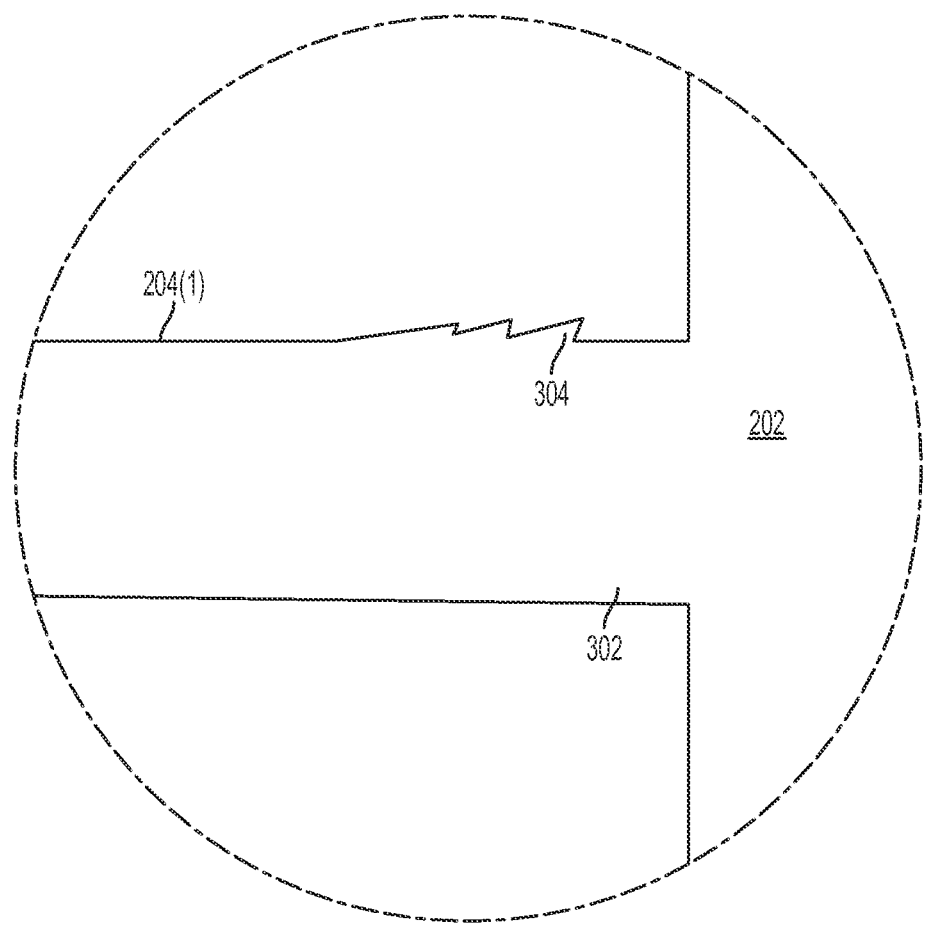
FIG. 3 is a detailed side view of the connection component of FIG. 2 according to an exemplary embodiment.

FIG. 3 is a detailed side view of the connection component of FIG. 2 according to an exemplary embodiment. The first flange 204(1) includes the top surface 205(1) and the bottom surface 207(1). The first flange 204(1) is tapered such that a first region 302, disposed adjacent to the base 202, is thicker than a second region 303 (shown in FIG. 2) disposed distal to the base 202. At least one serration 304 extends from the top surface 205(1) in the first region 302. As will be described in more detail hereinbelow, the at least one serration 304 increases friction between the top surface 205(1) of the first flange 204(1) and a surface engaged with the top surface 205(1) of the first flange 204(1). In various embodiments, the at least one serration 304 extends from either the top surface 205(1) or the bottom surface 207(1) in the first region 302. In various alternative embodiments, the at least one serration 304 may include a plurality of serrations extending from both the top surface 205(1) and the bottom surface 207(1) in the first region 302. In other embodiments, flanges utilizing principles of the invention may include serrations of different profile shapes such as, for example, curved or triangular. In other embodiments, the at least one serration 304 may be omitted. By way of example, the first flange 204(1) is depicted in FIG. 3; however, one skilled in the art will recognize that the second flange 204(2) is similar in terms of construction and operation to the first flange 204(1).

Figure 4:
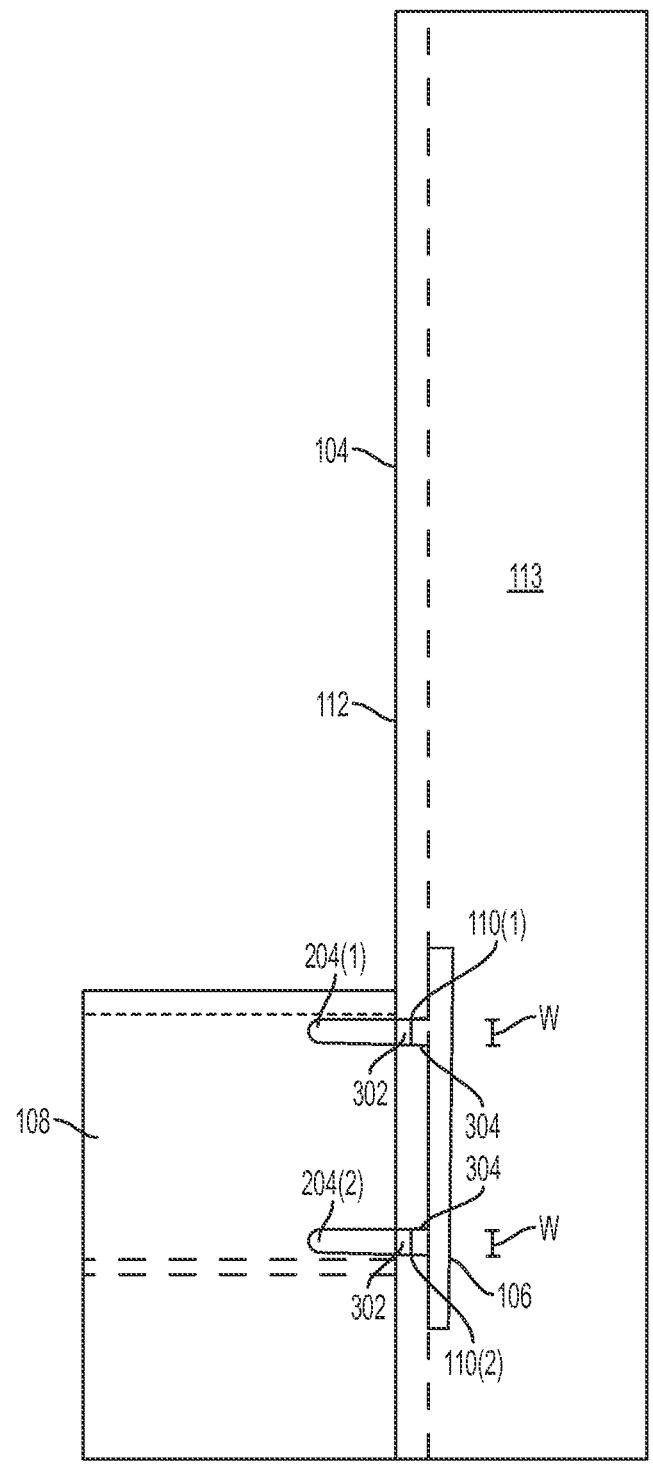
FIG. 4 is a cross-sectional view of the structural assembly having the connection component installed therein according to an exemplary embodiment.

FIG. 4 is a cross-sectional view of a structural assembly having a connection component installed therein according to an exemplary embodiment. In a typical embodiment, the connection component 106 is placed inside the interior region 113 of the second component 104. The first flange 204(1) is inserted through the first slot 110(1) and the second flange 204(2) is inserted through the second slot 110(2). After insertion, the first flange 204(1) and the second flange 204(2) protrude outwardly from the interior face 112 of the second component 104 in a generally orthogonal orientation. However, in various alternative embodiments, flanges utilizing principles of the invention may be arranged at any angle with respect to the second component 104. Such alternative embodiments accommodate coupling of the first component 102 and the second component 104 at a variety of angles including, for example, acute, right, or obtuse angles. In various alternative embodiments, the first component 102 and the second component 104 may be mitered to facilitate connection.

Still referring to FIG. 4, the first slot 110(1) and the second slot 110(2) are of a width (w). In a typical embodiment, the width (w) is sufficiently sized to allow one of the first flange 204(1) or the second flange 204(2) to pass therethrough. In other embodiments, the width (w) slightly smaller than the first region 302 of the first flange 204(1) and the second flange 204(2) thus creating an interference fit between the first and second slots 110(1)-(2) and the first region 302 of the first flange 204(1) and the second flange 204(2). Such an interference fit provides that, once assembled, the connection component 106 may not be easily disengaged from the second component 104. In various embodiments, the at least one of serration 304 further increases friction between each of the first and second slots 110(1)-(2) and the first region 302.

Referring still to FIG. 4, during assembly, tapering of the first and second flanges 204(1)-(2) provides several advantages. First, the first and second tapered flanges 204(1)-(2) acts to distribute a compressive force around a perimeter of the first and second slots 110(1)-(2). Second, the first and second tapered flanges 204(1)-(2) act as a leading edge and facilitate alignment of the first and second flanges 204(1)-(2) with the first and second slots 110(1)-(2), respectively. Furthermore, the first and second tapered flanges 204(1)-(2) reduces a magnitude of force required to assemble the connection component 106 with the second component 104 or the first component 102. Finally, the first and second tapered flanges 204(1)-(2) accurately aligns the connection component 106 within the interior gap 108. In this manner, the first and second flanges 204(1)-(2) are self-aligning.

Figure 5:
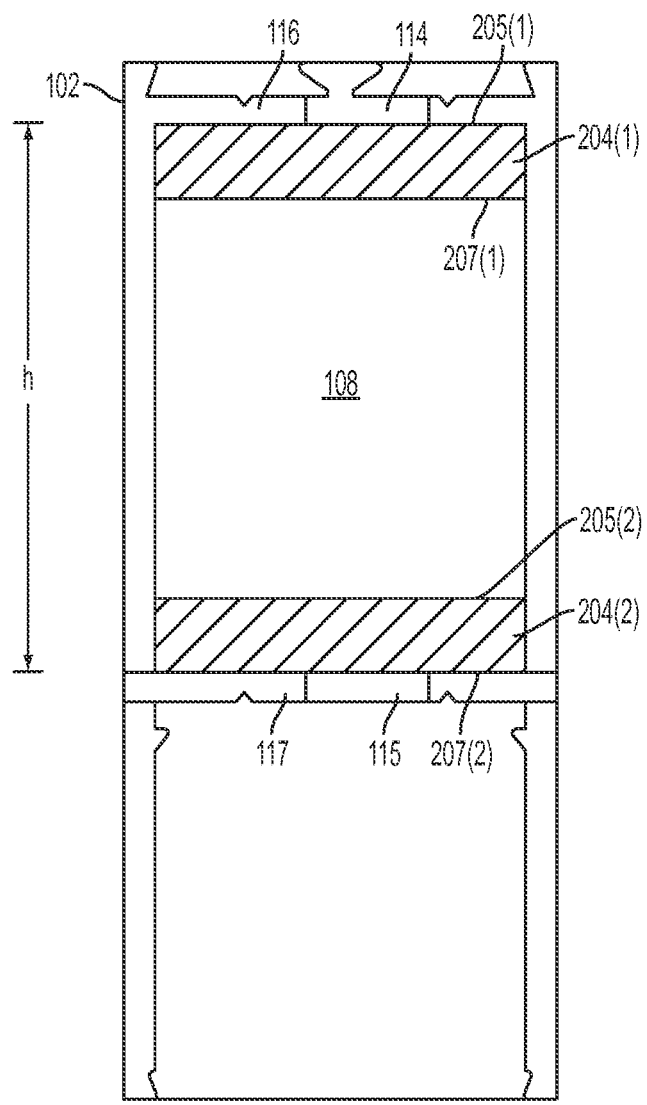
FIG. 5 is an end view of a first component showing placement of the connection component therein according to an exemplary embodiment.

FIG. 5 is an end view of a first component showing placement of the connection component therein according to an exemplary embodiment. Referring now to FIGS. 4 and 5, the first and second flanges 204(1)-(2) are arranged such that the top surface 205(1) of the first flange 204(1) and the bottom surface 207(2) of the second flange 204(2) are spaced from each other by a distance generally equal to the height (h) of the interior gap 108. In a typical embodiment, the first and second flanges 204(1)-(2) are received within the interior gap 108. Upon installation, the first flange 204(1) engages an interior face of the first surface 116 of the first component 102 while the second flange 204(2) engages an interior face of the second surface 117. Spacing between the first and second flanges 204(1)-(2) is such that engagement of the first surface 116 and the second surface 117 compresses the first and second flanges 204(1)-(2) in a direction towards each other. Compression of the first and second flanges 204(1)-(2) greatly increases friction between the first flange 204(1) and the first surface 116 and greatly increases friction between the second flange 204(2) and the second surface 117 thereby creating an interference fit between the connection component 106 and the first component 102. Such an interference fit prevents the first component 102 from being disengaged from either the connection component 106 or the second component 104. In this manner, the connection component 106 imparts additional structural integrity to the assembly 100.

Still referring to FIGS. 4 and 5, in various embodiments, the at least one serration 304 further increases friction between the first flange 204(1) and the first surface 116 and further increases friction between the second flange 204(2) and the second surface 117. Once the first component 102 and the connection component 106 are operatively engaged, the access port 114 provides access for the first component 102 to be secured to the connection component 106 through a process such as, for example, welding, gluing, brazing, soldering, chemical bonding, or other similar process. In various embodiments, a second access port 115 may be formed through the second surface 117. The second access port 115 provides access to the second flange 204(2). In various alternative embodiments, an interference fit is not present between the connection component 106 and the first component 102. In such embodiments, the connection component 106 is secured to the first component by a process such as, for example, welding, gluing, brazing, soldering, chemical bonding, or other similar process applied via the first access port 114 and the second access port 115.

Still referring to FIGS. 4 and 5, in a typical embodiment, assembly of the structural components using the connection component 106, the second component 104, and the first component 102 may be achieved by hand. In various other embodiments, tools such as, for example, mechanical or hydraulic presses may be used to assist assembly of the structural components using the connection component 106 in conjunction with the second component 104 and the first component 102. In other embodiments, the structural components such as, for example, the first component 102, the second component 104, and the connection component 106 may be drawn together using a removable fastening system.

Figure 6:
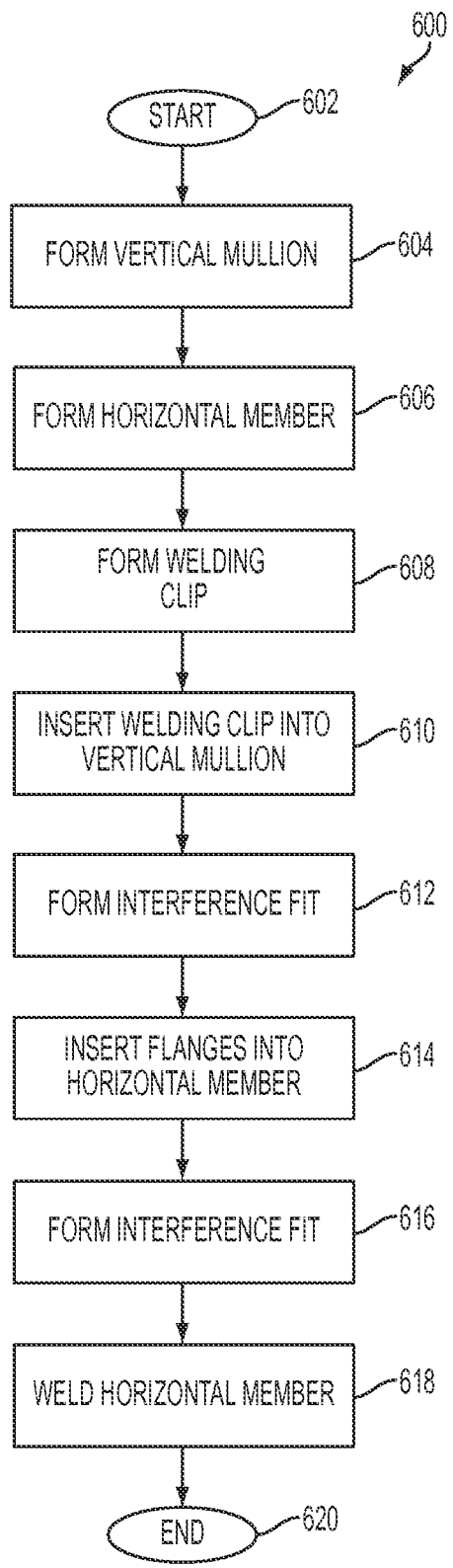
FIG. 6 is a flow diagram of a process for forming a structural assembly according to an exemplary embodiment.

FIG. 6 is a flow diagram of a process for forming a structural assembly according to an exemplary embodiment. A process 600 begins at step 602. At step 604, the second component 104 is formed having slots for the connection component 106 to pass therethrough. At step 606, the first component 102 is formed with the interior gap 108 therein. At step 608, the connection component 106 is formed with the first flange 204(1) and the second flange 204(2). At step 610, the connection component 106 is inserted into the second component 104 such that the first flange 204(1) and the second flange 204(2) engage the first slot 110(1) and the second slot 110(2), respectively. At step 612, an interference fit is created between the connection component 106 and the second component 104. At step 614, the first flange 204(1) and the second flange 204(2) are inserted into the interior gap 108 of the first component 102. At step 616, in some embodiments, an interference fit is formed between the connection component 106 and the first component 102. In some embodiments, step 616 may be omitted and no interference fit is formed between the connection component 106 and the first component 102. At step 618, the first component 102 is secured into place through a process such as, for example, welding, gluing, brazing, soldering, chemical bonding, or any other similar process. The process ends at step 620.

The advantages of the embodiments disclosed herein will be apparent to those skilled in the art. First, the assembly 100 as shown and described herein eliminates any need for installation of screws or other fasteners prior to securement thereby reducing overall material and labor costs associated with structural assemblies. Second, the interference fit present between the connection component 106 and the first component 102 substantially reduces incidental movement or "play" of the first component 102 relative to the second component 104. Furthermore, the interaction of the first and second flanges 204(1)-(2) with the first surface 116 and the second surface 117 lends additional structural support to the assembly 100.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein. For example, although the interference fit associated with the connection component 106 has been described herein as being created via force, one skilled in the art will recognize that the interference fit of the present invention could also be created through thermal expansion. In addition, the first and second flanges 204(1)-(2) have been shown and described herein as being arranged in a generally vertically-spaced relationship with respect to each other. However, one skilled in the art will recognize that flanges utilizing principles of the invention may, in various embodiments, be arranged in a horizontally-spaced relationship with respect to each other. In other embodiments, a combination of horizontal and vertical flanges may be utilized. Next, in some embodiments, flanges utilizing principles of the invention may be curved to allowing joining of curved structural members. Finally, the connection component 106 is shown and described as being located in an interior region 113 of a second component 104. However, one skilled in the art will recognize that, in various embodiments, the connection component 106 may have flanges present on either side of the base 202. Such an arrangement allows placement of the connection component 106 directly on the interior surface 112 of the second component 104. The embodiments described herein should be taken as illustrative only.

What is claimed is:

1. A method for assembling structural components, the method comprising:

providing a first component having a first surface and a second surface, the first surface and the second surface being spaced from each other by a first distance;

providing a connection component having at least two flanges, the at least two flanges connected to each other via a cross member, the at least two flanges being spaced from each other by the first distance;

coupling the connection component within a second component such that the at least two flanges protrude from at least two slots formed in the second component, the at least two slots being spaced from each other by the first distance, the cross member being disposed within the second component for allowing a portion of the second component to abut the first component and be secured between the cross member and the first component;

inserting the at least two flanges between the first surface and the second surface; and securing the first component directly to the second component disposed contiguous thereto via friction between the first component and the connection component.

2. The method of claim 1, further comprising compressing the at least two flanges.

3. The method of claim 1, wherein the first surface and the second surface define an interior gap.

4. The method of claim 3, wherein the securing comprises orienting the first component and the second component at an approximately right angle.

5. The method of claim 3, wherein the first component and the second component are joined via welding.

* * * * *